United States Patent [19]

Weeks

[11] 4,449,756

[45] May 22, 1984

[54] TRACKED VEHICLE ROAD WHEEL

[75] Inventor: James B. Weeks, Haslett, Mich.

[73] Assignee: Motor Wheel Corporation, Lansing, Mich.

[21] Appl. No.: 356,457

[22] Filed: Mar. 9, 1982

[51] Int. Cl.³ ............................ B60B 3/00; B60B 7/02
[52] U.S. Cl. ............................ 301/37 P; 301/63 PW; 305/11; 474/92
[58] Field of Search ................. 474/92; 198/780, 193, 198/37, 35 R, 842, 843, 493, 494; 305/11, 12, 57, 27; 301/37 P, 63 PW, 37 R, 63 R; 152/323–329; 295/7, 30, 34

[56] References Cited

U.S. PATENT DOCUMENTS

| 3,669,501 | 6/1972 | Derleth | 301/63 R |
| 4,217,944 | 8/1980 | Pascal | 301/63 PW X |
| 4,251,476 | 2/1981 | Smith | 301/37 R X |

FOREIGN PATENT DOCUMENTS 1377832  9/1964  France ............................ 301/63 PW

OTHER PUBLICATIONS

Kirschner, Francis; Inter-noise 72 Proceedings, Oct. 1972; "New Developments in the Control of Railroad Wheel Screech Noise," pp. 225–230.

*Primary Examiner*—David A. Scherbel
*Attorney, Agent, or Firm*—Barnes, Kisselle, Raisch, Choate, Whittemore & Hulbert

[57] ABSTRACT

A road wheel for a track-laying vehicle which comprises a metal disc wheel including a wheel mounting disc, a rim extending axially from the periphery of the disc and a strengthening flange projecting radially inwardly from the disc-remote edge of the rim. An overlay body of foamed elastomeric material is molded onto the disc wheel to fill the area between the disc, rim and flange, and thereby prevent accumulation of mud in this area. The outboard surface of the overlay body is pitched axially from the disc to the rim to self-clean as the wheel is rotating. A solid rubber tire is carried externally of the rim.

15 Claims, 4 Drawing Figures

U.S. Patent May 22, 1984 4,449,756
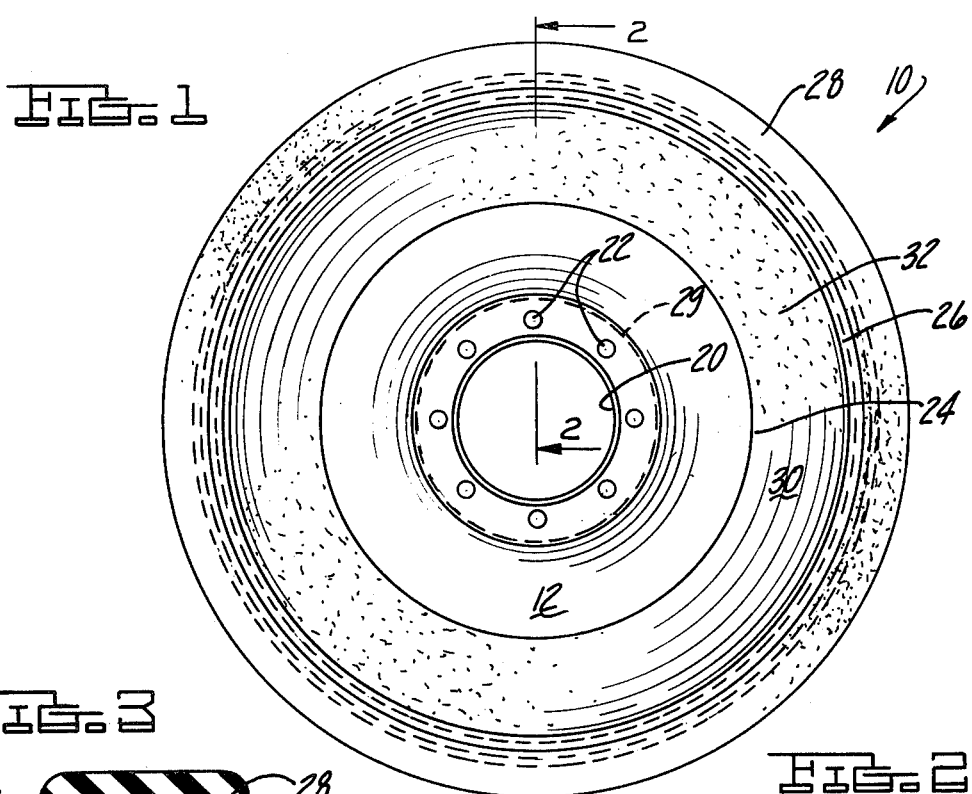
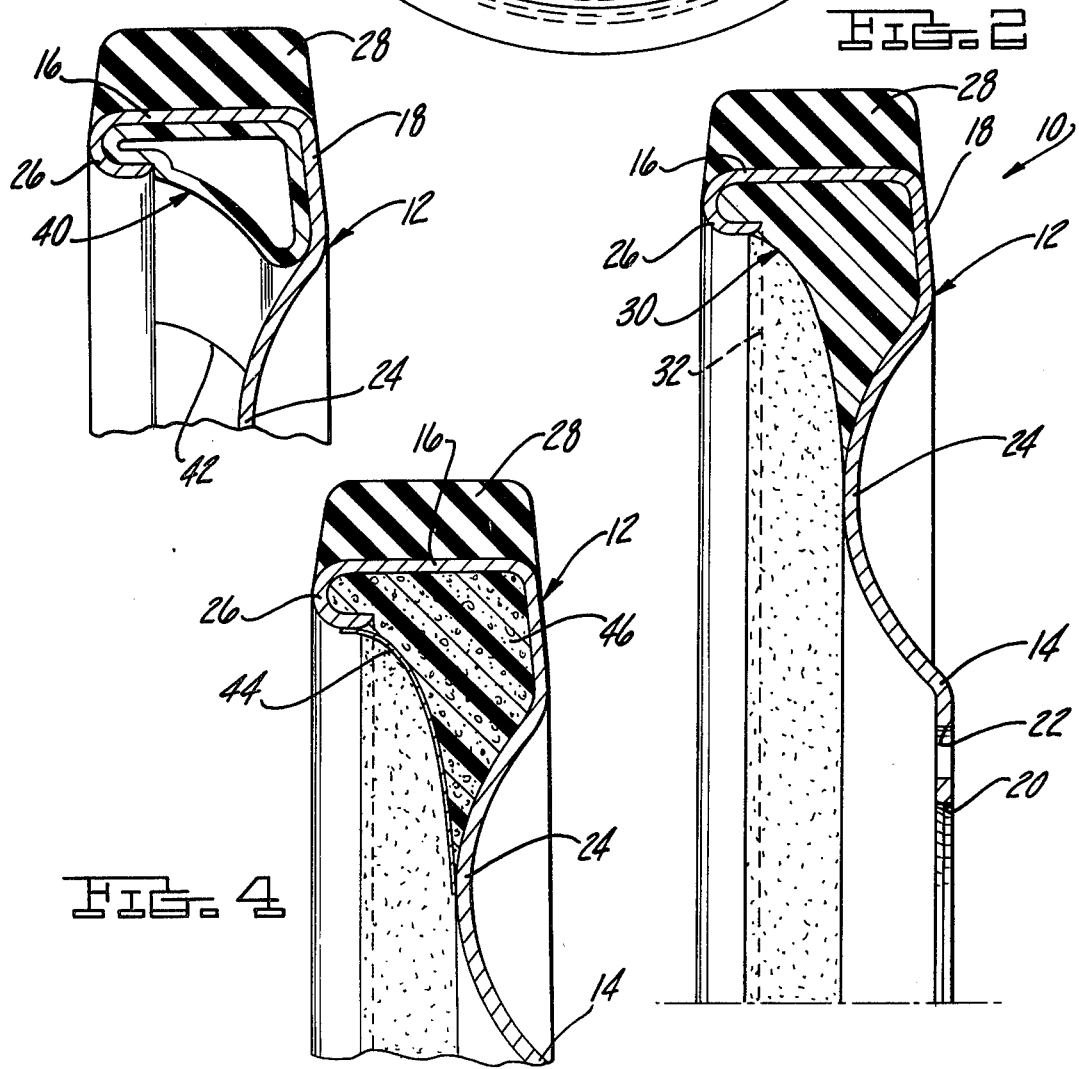

TRACKED VEHICLE ROAD WHEEL

The present invention is directed to disc wheels, and more particularly to road wheels for track-laying vehicles.

Military track-laying vehicles such as tanks and armored personnel carriers are often required to traverse muddy terrain, whereupon mud, dirt and pebbles, etc. tend to accumulate on the vehicle road wheels. Such accumulation may add in excess of one thousand pounds to the vehicle weight, decreasing mobility and fuel economy, increasing the tendency for wear and damage to the vehicle track, and resisting efforts to clean and/or decontaminate the vehicle where desired. Such additional weight may also have substantial deleterious effects upon the buoyancy characteristics of a vehicle of this type which is intended to be amphibious. The problems of added weight and fuel economy also prevail for non-amphibious civilian vehicles such as bulldozers.

Previous attempts to address the above-described mud accumulation problem have generally involved the provision of metal deflectors and/or dual-disc wheel designs which themselves add to the vehicle weight and resulting disadvantages previously noted, and which also add to the vehicle cost. Additionally, such structures are difficult to weld or otherwise seal against leakage, and are also difficult to clean and decontaminate in the event of any leakage of mud past the shield or between the dual-disc structure.

It is therefore an object of the present invention to provide an improved wheel for tracked vehicles and like applications which overcomes some or all of the aforementioned difficulties encountered in connection with the prior art.

A more specific object of the present invention is to provide an improved wheel of the described type and a method of resisting accumulation of mud and dirt thereon under the operating conditions previously noted.

A yet more specific object of the invention is to provide an improved road wheel for track-laying vehicles which is designed and contoured not only to resist accumulation of mud and dirt, etc. as described, but also to effect a "self-cleaning" action to promote actual removal of such accumulation during normal operation.

Another object of the invention is to provide a road wheel of the described type which embodies improved sound damping characteristics.

In the following description and claims, unless otherwise indicated, directional adjectives such as "outboard" and "outwardly" are taken with reference to the normal mounting orientation of the wheel on a vehicle, and no unwarranted limitations should be inferred therefrom.

The invention, together with additional objects, features and advantages thereof, will be best understood from the following description, the appended claims and the accompanying drawings in which:

FIG. 1 is an outboard elevational view of a presently preferred embodiment of the tracked vehicle road wheel in accordance with the present invention;

FIG. 2 is a sectional view taken substantially along the line 2—2 in FIG. 1; and FIGS. 3 and 4 are sectional views similar to FIG. 2 of respective alternative embodiments of the tracked vehicle road wheel in accordance with the present invention.

FIGS. 1 and 2 illustrate a presently preferred embodiment 10 of a road wheel for tracked vehicles and like applications. Wheel 10 is a composite assembly which includes a metal disc wheel 12 of generally conventional design comprising a disc 14 and an annular rim 16 projecting axially outwardly from the disc periphery 18. Disc 14 includes a central opening 20 to be received over a suitable hub or the like (not shown) and an array of circular openings 22 surrounding hub opening 20 for mounting wheel 10 onto a vehicle. The central or intermediate portion 24 of disc 14 between mounting openings 22 and disc periphery 18 is convex outwardly as viewed from the outboard direction, i.e. the left-hand direction in FIG. 2, for added strength and resilience. The disc-remote edge 26 of rim 16 is curled to form a closed arcuate flange for adding hoop strength to the rim. A solid rubber tire 28 is molded or otherwise affixed externally of rim 16.

In the embodiment shown in FIGS. 1 and 2, disc wheel 12 is of integral construction and of generally uniform thickness throughout. Wheel 12 as shown may be formed from sheet steel stock in a series of blanking and bending operations. Alternatively, wheel 12 may be formed of separate disc, rim and/or flange segments which are suitably welded in assembly. The disc and rim may be of one-piece spun-tapered construction and have a separate ring welded thereto to form flange 26. Casting and forging operations are also contemplated.

It will be noted with reference to FIG. 2 that the generally cup-shaped configuration of rim 16 and disc 14, particularly in combination with flange 26, effectively forms an annular channel or pocket. Mud and the like splashed onto the outboard surface of disc 12 during normal operation tends to flow along the disc surface due to centrifugal forces caused by wheel rotation, and to accumulate in the channel formed by flange 26, rim 16 and disc periphery 18. In accordance with the present invention, an overlay or body 30 of elastomeric material is located in this channel to prevent or block accumulation of mud. Furthermore, the outer surface 32 of body 30 is contoured with respect to disc 14, rim 16 and flange 26 to cooperate with the above-mentioned centrifugal forces during operation to remove any mud which splashes onto the disc outboard surface, and thereby effect a "self-cleaning" action.

More specifically, body 30 in the preferred embodiment of FIGS. 1 and 2 comprises a foamed elastomeric material such as polyurethane, polyethylene or polypropylene molded onto the opposing surface of wheel 12. Body 30 completely fills the annular channel formed by disc periphery 18, rim 16 and flange 26, and extends radially inwardly along the outboard surface of disc 14 to about the apex or peak of disc intermediate portion 24. The outer or disc-remote surface 32 of body 30 is pitched axially outwardly from disc 14 to adjacent the disc-remote edge of rim 16. More specifically, surface 32 is concave and of decreasing radius of curvature from disc portion 24 to flange 26, blending smoothly into the adjoining axially outwardly facing surface of disc 14 and radially inwardly facing surface of flange 26 to promote smooth "self-cleaning" flow of mud as previously described. It will be noted in this respect that the surface 32 (FIG. 2) is at a greater angle with respect to the axis of wheel 12 at the radially inner edge thereof than at the radially outer edge, and that no portion of surface 32 faces radially outwardly Overlay body 30 is preferably permanently adhesively affixed to wheel 12 by reason of being molded thereon in accordance with the teachings of the U.S. Pat. Nos. 3,756,658 and 3,815,200 assigned to the assignee hereof, the disclosures of which are incorporated herein by reference. A prefabricated wheel 12 is placed outboard side down over a preheated mold with flange 26 and disc portion 24 sealingly supported with respect to the opposing mold surface. A reactive elastomeric mixture is then poured through suitable openings (not shown) in the wheel into the cavity between the opposing mold and wheel outboard surfaces and allowed to cure in situ to form an integral elastomeric overlay permanently and sealingly secured to the wheel. Suitable molding apparatus may be formed by following the teachings of U.S. Pat. Nos. 3,762,677 and 3,956,451, assigned to the assignee hereof and incorporated herein by reference.

The reaction mixture poured into the mold cavity as described preferably comprises a so-called "self-skinning" foam—i.e. one which inherently forms a closed-cell tough resilient skin at surface 32 during the curing operation. Overlay body 30, comprising a low density core and integral higher density skin, must be sufficiently resilient upon curing to permit stress and flexure of rim 16 and/or disc 14 during normal operation without cracking at surface 32 or loss of sealing adhesion at the adjoining disc and flange surfaces. In order to increase buoyancy of the wheel and vehicle, it is preferred that the bulk density of overlay body 30 following completion of the curing operation be less than the density of water (62.43 lbs/cubic foot). Toward this end, overlay body 30 may include low-density fillers such as hollow glass microspheres or the like. The foamed reaction mixture may be colored as desired.

In a preferred embodiment of the invention, overlay body 30 comprises a predominantly (at least 90%) closed cellular urethane foam having a density of five to fifteen pounds per cubic foot, with a puncture and water resistance skin thickness of 0.04 to 0.10 inches thick. It may be desirable in some instances to mold overlay body 30 and tire 28 to wheel 12 in a single operation.

An alternative method of forming overlay body 30 in the form of a low density core and higher density skin layer is by following the teachings of U.S. Pat. No. 4,251,476, also assigned to the assignee hereof and incorporated herein by reference. In accordance with such teachings, the mold surface is first sprayed or otherwise coated with one or more layers of a suitable elastomeric reaction mixture and partially cured in situ. The preformed wheel is then placed over the mold surface as previously described, and a second reaction mixture is then poured or otherwise injected into the mold/wheel cavity. The second reaction mixture is then cured and the mold surface layers are finish-cured in situ to form an integral structure comprising the lower density core and higher density skin layer. The wheel formed by either method may be suitably painted following curing. An advantage of the second method hereinabove described is that the desired pigment may be added to the first reaction mixture, which may eliminate a post-curing painting step. It is also possible to pre-color the foamed reaction mixture in practicing the first method. As a third alternative, a self-skinning or non-skinning overlay may be molded onto a disc wheel, and a skin thereafter applied in a post-molding operation. This separate skinning operation may be carried out by molding, spraying, painting or otherwise applying a suitable reaction mixture, such as urethane. The separately applied skin should embody all of the desirable properties hereinabove described in terms of color and resistance to impact, penetration, abrasion, chemical attack, ultraviolet light and water absorption.

FIG. 3 illustrates an alternative embodiment of the invention wherein the overlay body comprises a separately formed insert 40 formed of an extruded or injection molded elastomeric material. Insert 40 may comprise a hollow tubular structure of tough closed-cellular material as shown, may be filled with low density material, or may be of solid construction. In assembly, insert 40 is cut to desired length and then sealingly secured to wheel 12 with opposing ends in sealing abutment as at 42. In most applications, it is envisioned that insert 40 will be adhesively secured to wheel 12, although such adhesion may not be required in cases where the geometry of the wheel and/or insert will permit sealing securement without the use of adhesives.

FIG. 4 illustrates another alternative embodiment of the invention wherein a separate preformed skin 44 of preformed elastomeric or sheet metal construction is adhered and sealingly secured to wheel 12 by the overlay coil 46 in accordance with the teachings taught by U.S. Pat. No. 3,669,501 assigned to the assignee hereof and incorporated herein by reference.

Preformed or integrally formed protective foam surfacing material of fabric, scrim or random fiber reinforced construction may be applied in like manner during any of the skin forming techniques described to enhance abrasion, wear, penetration and stability characteristics when required.

The invention claimed is:

1. A composite wheel for tracked vehicles and the like comprising a generally cup-shaped disc wheel including a disc and an annular rim extending axially from the periphery of said disc, and a body of elastomeric material affixed to said wheel internally of said rim and having a pitched outer surface of closed cellular water-resistant construction extending axially and radially from said disc at a radially inner surface edge to adjacent the disc-remote edge of said rim at a radially outer surface edge and being sealed to adjoining surface portions of said disc and rim at said edges, said surface being concave and having a slope at said radially inner surface edge which is at a greater angle with respect to the axis of said wheel than is the slope at said radially outer edge, and with no portion of said surface facing radially outwardly.

2. The composite wheel set forth in claim 1 wherein said disc wheel includes strengthening flange means projecting radially inwardly from said disc-remote edge of said rim and forming with said disc and rim an annular channel internally of said rim, and wherein said body fills said channel with said pitched outer surface extending from said disc to said flange means.

3. A composite wheel for tracked vehicles and the like comprising a generally cup-shaped disc wheel including a disc, an annular rim extending axially from the periphery of said disc and strengthening flange means affixed to said rim and projecting radially inwardly from said rim at a position spaced axially from said disc so as to form with said disc and rim an annular channel internally of said rim, and a body of elastomeric material affixed to said wheel internally of said rim so as to fill said channel and having a pitched outer surface of closed cellular water-resistant construction extending axially and radially from said disc to said flange means and being sealed to adjoining surface portions of said disc and flange means.

4. The composite wheel set forth in claim 3 wherein said body has a bulk density which is less than the density of water.

5. The composite wheel set forth in claim 4 wherein said body comprises a solid overlay of foamed elastomeric material molded onto and adhered to opposing surfaces of said disc and rim, said overlay having sufficient flexibility and resilience to accommodate flexure of said disc and rim during normal operation.

6. The composite wheel set forth in claim 5 wherein said overlay comprises a closed cellular body having a density in the range of 5 to 15 pounds per cubic inch and an integral closed cellular skin 0.04 to 0.10 inches thick forming said outer surface.

7. The composite wheel set forth in claim 6 wherein foamed elastomeric material is selected from the group consisting of polyurethane, polyethylene and polypropylene.

8. The composite wheel set forth in claim 5 or 7 wherein said outer surface is concave.

9. The composite wheel set forth in claim 1, 3 or 5 wherein said outer surface is concave and of decreasing radius of curvature from adjacent said disc to said edge of said rim.

10. The composite wheel set forth in claim 4 wherein said body comprises a performed insert assembled onto and sealingly secured to said rim and disc.

11. In a wheel for a tracked vehicle and the like comprising a disc wheel including a disc and an annular rim affixed to the periphery of said disc and extending axially therefrom to form a generally cup-shaped internal wheel cavity, a method of preventing accumulation of mud and the like within said cavity comprising the steps of filling said cavity internally of said rim and adjacent the rim-disc juncture with a body of low density elastomeric material, covering said body with a higher density skin of closed cellular elastomeric construction which extends from an inner skin edge contiguous with said disc to an outer skin edge adjacent to the disc remote edge of said rim, and sealing said skin edges to adjoining surfaces of said disc and rim.

12. The method set forth in claim 11 comprising the additional step of contouring the outer surface of said skin to possess a concave profile with a radius of curvature which decreases from adjacent said disc to said rim.

13. In a wheel for tracked vehicles and the like comprising a cup-shaped metal wheel including a disc, an annular rim affixed to and extending axially from the periphery of said disc, and flange means spaced from said disc and extending radially inwardly from said rim, the improvement for preventing accumulation of mud and dirt internally of said rim between said disc and said flange means comprising a body of elastomeric material affixed to said wheel internally of said rim and having a pitched outer surface of water-resistant construction which extends axially and radially from said disc to the free edge of said flange means and being sealed to adjoining surfaces of said disc and said flange means.

14. The comosite wheel set forth in claim 11, 3 or 13 further comprising a solid rubber tire affixed to and projecting radially outwardly from said rim.

15. The composite wheel set forth in claim 13 wherein said outer surface is concave and of decreasing radius of curvature from adjacent said disc to said edge of said rim.

* * * * *